United States Patent

[11] 3,617,751

| [72] | Inventors | Kenneth Levy<br>Framingham;<br>James M. Mulvaney, Southboro; David<br>Friedman, Framingham, all of Mass. |
|---|---|---|
| [21] | Appl. No. | 850,976 |
| [22] | Filed | Aug. 18, 1969 |
| [45] | Patented | Nov. 2, 1971 |
| [73] | Assignee | Computervision Corporation<br>Waltham, Mass. |

[54] METHOD AND APPARATUS FOR ARTICLE POSITIONING UTILIZING AN INCREMENTAL ARTICLE DRIVE SYSTEM AND NULL TRANSIT COUNTER
10 Claims, 10 Drawing Figs.

[52] U.S. Cl. ............................................ 250/201,
250/202, 318/577
[51] Int. Cl. ........................................ G01j 1/20,
G05b 1/00
[50] Field of Search .................................... 250/201,
202, 203, 204; 318/577

[56] References Cited
UNITED STATES PATENTS
3,082,363   3/1963   Inaba et al. .................. 250/204 X Primary Examiner—James W. Lawrence
Assistant Examiner—T. N. Grigsby
Attorney—Chittick, Pfund, Birch, Samuels & Gauthier ABSTRACT: A system for positioning an article in a preselected translational and rotary orientation with respect to two coordinate axes. The system produces X, Y and θ electrical signals each having a parameter which changes between a first state and a second state depending upon the direction of displacement of the article from the preselected orientation. Three article positioners incrementally move the article in the X, Y and θ directions in response to the respective X Y and θ electrical signals. Three corresponding counters count the changes in state of the x, y and θ electrical signals. When the counts in the X, Y and θ counters reach preselected counts, the three article positioners are inhibited. At this point, the article is positioned within one X, Y and θ movement increment of the preselected orientation.

PATENTED NOV 2 1971 3,617,751
SHEET 1 OF 5

INVENTOR.
KENNETH LEVY
JAMES M. MULVANEY
DAVID FRIEDMAN

BY Chittick, Pfund, Birch, Samuels, & Gauthier

INVENTOR.
KENNETH LEVY
JAMES M. MULVANEY
DAVID FRIEDMAN
BY

METHOD AND APPARATUS FOR ARTICLE POSITIONING UTILIZING AN INCREMENTAL ARTICLE DRIVE SYSTEM AND NULL TRANSIT COUNTER

BACKGROUND OF THE INVENTION

This invention relates to article positioning systems in general and, more particularly, to an automatic, null seeking, servo controlled, incremental movement article positioning system.

In the semiconductor industry at the present time most semiconductors made go through a mask alignment system in which a mask is aligned to the semiconductor wafer before the mask-wafer combination is photographically exposed. Typically, each integrated circuit undergoes the mask alignment operation from five to nine times as successive patterns are photographed onto the silicon wafer between the principal manufacturing steps of diffusion, deposition, etching or metallizing. The alignment operations must be performed with great precision in order to obtain the required alignment accuracy of from one-half micron (0.000020 inch) to 2 microns (0.000080 inch) depending upon the particular semiconductor application.

Mask-to-wafer alignment is now performed by women operators using manually controlled integrated circuit mask alignment machines. The alignment machines generally have a split-field, high-powered microscope-viewing system and a manually controlled and powered micropositioner for moving a three-axis wafer support mechanism in the X,Y and theta (rotary) directions. One current and representative example of an I.C. mask aligner is the Model 686, Mask-to-Wafer Alignment and Exposure System manufactured by Photo-Lithographic Products, a Division of Kulicke and Soffa Industries, Inc., Fort Washington, Pennsylvania.

Although the present manually operated mask-alignment systems are capable of producing the necessary alignment accuracy, the I.C. wafer yields are often subject to wide and essentially unpredictable fluctuations. Operator fatigue, bad days and other human factors can and do substantially lower the production yields. Since these factors are not really susceptible to the effective control that can be exercised over semi- and fully automated manufacturing processes, efforts have been made in the past to provide some degree of automation in the alignment phase of semiconductor manufacture.

Some of the early work in this area was directed at solving the problem of accurately positioning a semiconductor device with respect to a bonding station for subsequent automatic bonding of the semiconductor leads. One automatic system for providing X- and Y-axes orientation of a transistor is described in U.S. Pat. No. 3,029,348, issued Apr. 10, 1962, to A. Heinz for Electro-Optical Servo System for Coarse and Fine Positioning of Transistors. The Heinz system utilizes the differential light reflection characteristics of the semiconductor surface to derive accurate positioning information in the form of electrical signals. After suitable amplification, the signals are used to drive X- and Y-axes positioning motors. Subsequent work by Heinz produced an automatic electro-optical system that provided both translational (X- and Y-axes) as well as rotational ($\theta$ axis) positioning of the article. Heinz's three-axis-positioning system is described in U.S. Pat. No. 3,207,904 issued Sept. 21, 1965, for Electro-Optical Article Positioning System.

In the two Heinz article-positioning systems mentioned above, the semiconductors were aligned with respect to the optical axis of a microscope. A plurality of photoelectric elements were located at the image plane of the microscope and positioned around the optical axis thereof. Each photoelectric element had an aperture mask which restricted the image viewing angles of the element to a predetermined geometric area of the semiconductor image. The electrical signals from the photoelectric elements, after combinational processing, provided the necessary X, Y and $\theta$ positioning information to drive the corresponding X, Y and $\theta\theta$ direct or alternating current positioning motors.

The basic concept of Heinz's light-balanced, null-seeking, automatic three-axis-positioning system can be applied to the problem of automating the mask-to-wafer alignment operation in the manufacture of integrated circuits. However, the alignment tolerances allowed in the mask-to-wafer alignment operation are so stringent when compared to the positioning tolerances in Heinz's automatic lead-bonding system as to be almost a difference in kind. For integrated circuit manufacture, the mask-to-wafer alignment must be accurate to generally 2 parts in 100,000 while accuracies of 1 part in 30 to 60 are sufficient for semiconductor lead-bonding (position accuracy to object size ratio).

It is therefore a general object of the present invention to provide an automatic mask-to-wafer alignment system that will fulfill the alignment requirements of integrated circuit manufacture.

It is a specific object of the invention to provide a three-axis-article-positioning system having an article drive mechanism that incrementally translates and rotates the article.

It is still another object of the invention to provide an article-positioning system with a zero "deadband."

It is a further object of the invention to provide a three-axis-article-positioning system that automatically inhibits the X, Y and $\theta$ incremental drive mechanism when the article is within one increment or step of the desired position.

In the accomplishment of these objects, the preferred embodiment of the invention provides an electro-optical light-balanced, null-seeking, servo-controlled, incremental movement positioning system. Photoelectric elements and combinational signal processing circuitry produce X, Y and $\theta$ electrical signals representing the displacement of the article with respect to the X-, X- and $\theta$-axes. The X-, Y- and $\theta$-signals each have a parameter which changes between a first state and a second state depending upon the direction of the displacement of the article from the desired position. Incremental article positioners, such as, step motors, respond to the X, Y and $\theta$ signals by producing article movement in one direction if the signal parameter is in the first state and in the opposite direction if the signal parameter is in the second state. Separate counting means are provided for counting the changes in state of the X-, Y- and $\theta$-signals which correspond to the number of X, Y and $\theta$ null transits. After the counters have each reached a predetermined count, the incremental article positioners are inhibited thereby leaving the article within one X, Y and $\theta$ step of the desired position.

The objects and features of the present invention will best be understood from the following detailed description of a preferred embodiment thereof, selected for purposes of illustration and shown in the accompanying drawings, in which.

The preferred embodiment of the present invention comprises an electro-optical, light-balanced, null-seeking, servo-controlled, incremental movement, article-positioning system. For purposes of illustration, the following description of the invention will be made with respect to an automatic, semiconductor mask-to-wafer aligner. However, it should be understood at the outset that the present invention is not limited to such mask aligners and that it is applicable to any null-seeking, incremental-movement system.

Figure 1B:
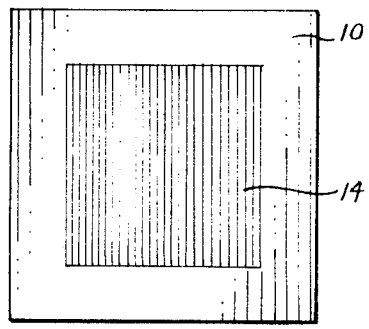
FIG. 1B is an enlarged view of a portion of the semiconductor wafer which includes one of the wafer targets shown in FIG. 1A.
Figure 2:
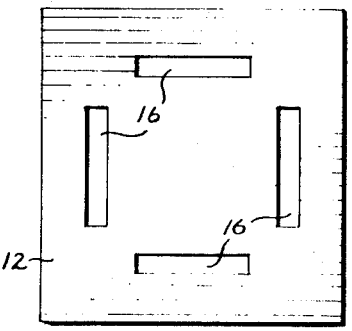
FIG. 2 is a plan view of an aligned mask which mates with the wafer target shown in FIG. 1B.
Figure 3:
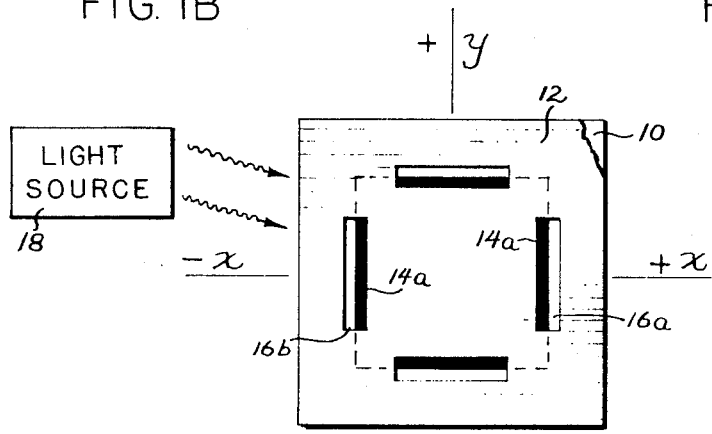
FIG. 3 is a plan view showing the mask of FIG. 2 superposed on the wafer target of FIG. 1B.

Turning now to the drawings, and particularly to FIGS. 1 through 4 thereof, there are shown in simplified form the basic elements of a mask-to-wafer alignment system. The object of the automatic mask-to-wafer aligner is to align a semiconductor wafer 10 (positive medium) with an overlying photographic mask 12 (negative medium). In order to accomplish this function, two alignment targets 14 are first marked on the semiconductor wafer 10 near the edges thereof and along one of the wafer coordinate axes, in this case the X-axis. The targets 14 each have a different light reflection characteristic from the background area of the wafer. A well-defined border is provided on the target to produce a sharp transition from the light-reflecting characteristic of the target to the different light reflection characteristic of the wafer background area. The mask has a plurality of windows or apertures 16 that are arranged on the mask so that when the mask is superposed on one of the wafer alignment targets 14, as shown in FIG. 3, the mask will mate with the target and, if the mask and wafer are correctly aligned, equal areas 14a of the target will be visible through the mask windows 16. After the wafer has been brought into close proximity and parallel to the mask, the pair are illuminated by light from suitable light source 18. The reflected light energy that is transmitted through the mask window 16a is collected and impinges upon a first photodetector 20 and, likewise, the reflected light energy that comes through mask windows 16b impinges upon a second photodetector 22. The output signals from photodetectors 20 and 22 are amplified by amplifiers 24 and 26, respectively, and applied as inputs to a comparator 28.

If the target area 14 is assumed to be dark with respect to the background area of the wafer 10 so that more light will be reflected from the wafer background than from the target, it can be seen that the output of the photodetectors will be equal and greater than zero only when the mask is aligned to wafer with equal areas of the target visible through mask windows 16a and 16b. If, on the other hand, the mask is misaligned, the photodetector viewing the window which has a greater area of the wafer background visible will produce a larger output signal indicating that the deadband must be moved in the direction of the window transmitting the most light. For example, looking at FIG. 3 which illustrates the aligned mask-to-wafer position, if it is assumed that the mask is shifted along the X-axis in the −X direction, photodetector 20 will receive more light through mask window 16a than photodetector 22 receives through the mask window 16b. In this situation, the comparator 28 produces a positive output signal which actuates wafer position X-step motor 30 and its associated mechanical linkage 31. The step motor-linkage combination incrementally advances the wafer, step-by-step, in a positive direction along the X-axis upon interrogation by a clock pulse. Conversely, a negative output from the comparator 28 causes the wafer position X-step motor and linkage to incrementally advance the wafer in a negative direction along the X-axis. When a light-balanced condition is reached so that the outputs from the photodetectors 20 and 22 are equal, the step motor stops if the comparator 28 has a built-in deadband.

Figure 4:
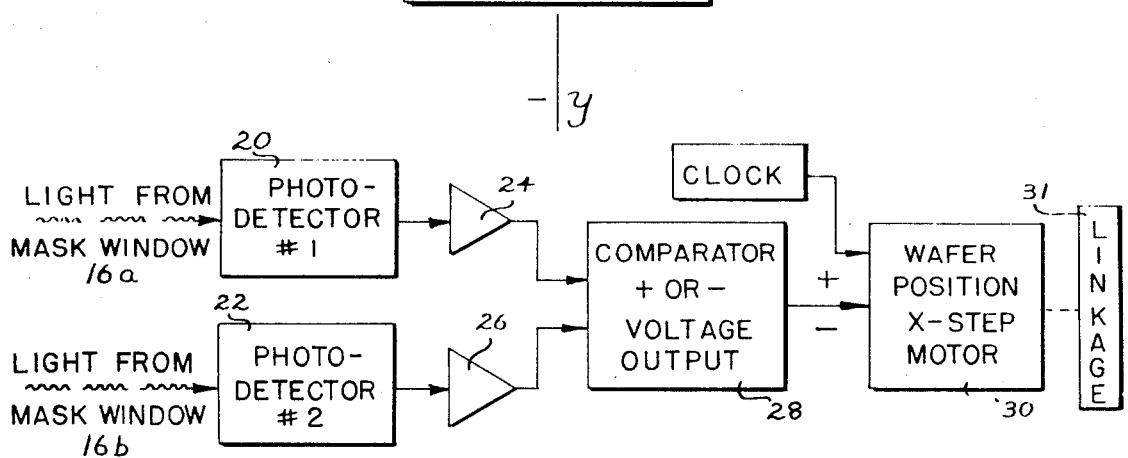
FIG. 4 is a simplified block diagram of the circuitry employed to provide differential, incremental movement between the mask and the wafer.
Figure 5:
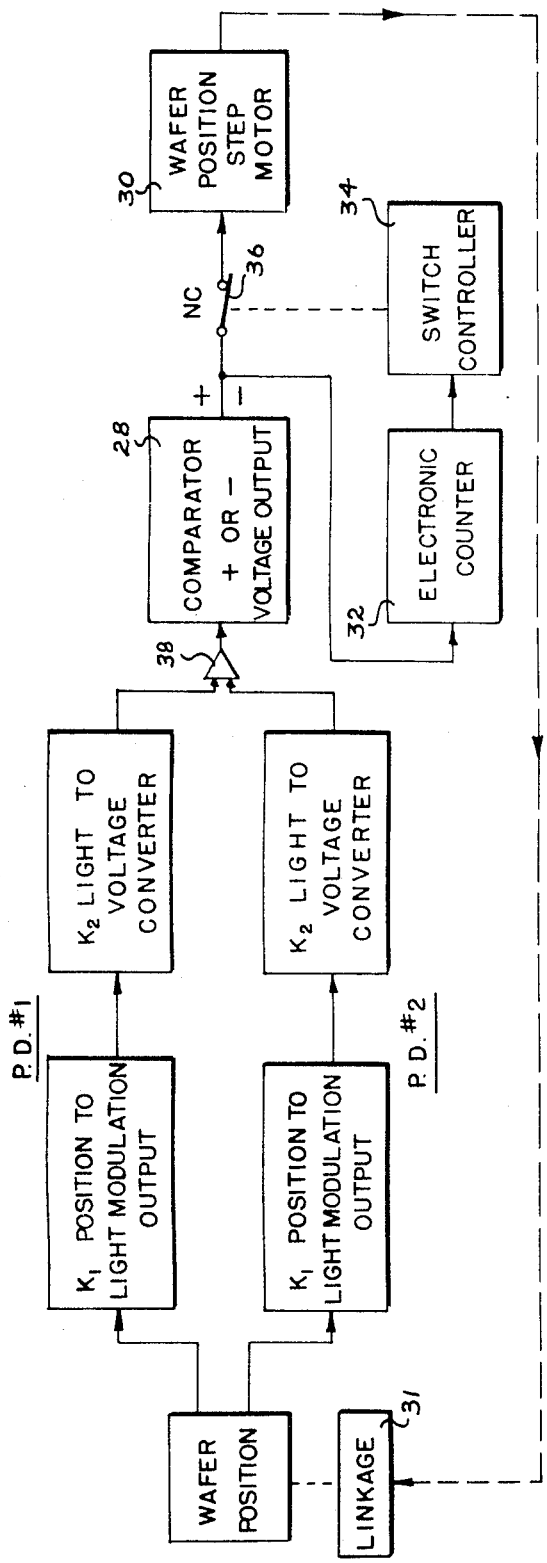
FIG. 5 is a simplified block diagram of the positioning system of the present invention.
Figure 6:
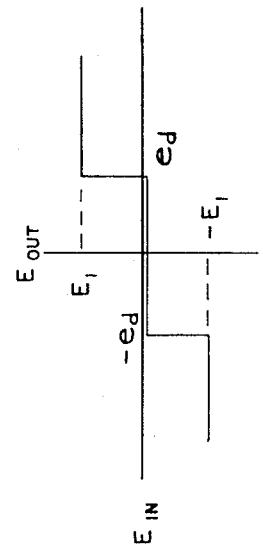
FIG. 6 is a diagram of the input-output characteristics of a comparator with deadband.

The system described above can be viewed as a conventional control system which is shown in block diagram form in FIG. 5 (excluding for the moment, the electronic counter 32, switch controller 34 and normally closed switch 36). The conventional control system and the system shown in FIG. 4 are impossible to stabilize without a deadband because the output of the comparator 28 is either positive or negative. The presence of the positive or negative output voltage from comparator 28 causes the step motor to continuously move first in one direction and then the other. To overcome the oscillation of the step motor and linkage about the null position, a deadband is normally built into the comparator. The input-output characteristics of a comparator with a deadband are illustrated in FIG. 6 where $e_d$ equals the deadband voltage.

The effect of the deadband can be shown in the following manner with reference to FIGS. 4, 5 and 6. The wafer position error is transformed to a voltage which represents the combined output from photodetectors #1 and #2. This error voltage appears at the output of summing amplifier 38 and is equal to:

$$E_{error} = (\text{Position Error}) \cdot (K_1) \cdot (K_2) \quad \text{(Eq. 01)}$$

where $K_1$ is the position-to-light modulation output and $K_2$ is the light-to-voltage converter, as shown in FIG. 5. If $E_{error}$ is less than $e_d$ as defined in FIG. 6, the comparator outputs a zero voltage and the wafer step motor remains stationary. Substituting $e_d$ into Eq. 01 and solving for position error, we obtain, $$\text{Position Error} = e_d / K_1 \cdot K_2 \quad \text{(Eq. 02)}.$$

This system has some very serious drawbacks, since $K_1$, the position-to-light modulation, varies greatly depending upon the contrast ratio of the light to dark areas on the wafer 10. Since $K_1$ cannot be controlled and the system must be stabilized to prevent oscillation, $e_d$ must be made large enough to assume stability for the maximum value that $K_1$ can obtain.

If we consider that $e_d$ is fixed for $K_{1max}$, the position error for $K_{1max}$ is Position Error $K_{1max} = e_d / K_{1max2}$ (Eq. 03). If $K_1$ now drops to $K_{1min}$, the position error is given by Position Error $K_{1min} = e_d / K_{1min2}$ (Eq. 04).

Dividing Eq. 0—b 4 by Eq. 03 we obtain $$\frac{\text{Position Error } K_{1\,min}}{\text{Position Error } K_{1\,max}} = \frac{K_{1\,max}}{K_{1\,min}}$$

Since $K_1$ can vary by approximately 10:1, the position error therefore also varies by 10:1 depending upon the particular type of semiconductor wafer being positioned by the system. Thus, using a normal deadband comparator, we are forced to accept a position error which is an order of magnitude greater than the desired error when unfavorable target-to-wafer background contrast ratios are present.

To keep the position error as small as possible, the deadband $e_3$ must be reduced. In fact, the ideal solution would be $e_d$ equal to zero. FIG. 5 with the addition of the electronic counter 32, switch controller 34 and normally closed switch 36 illustrates the method and from a block diagram standpoint, the apparatus by which this can be accomplished. The comparator 28 has no deadband built into it so that $e_d$ equals zero. In the absence of the electronic counter 32, switch controller 34 and switch 36, the system will oscillate about the null position with the amplitude of the oscillation being equal to the output step size of the step motor and linkage. In other words, a positive voltage output by the comparator will cause a positive step by the step motor 30 and linkage 31. This in turn causes the wafer to move through null and then the comparator provides a negative voltage causing a negative step, etc. Therefore, about the null position, the wafer oscillates at a frequency determined by the stepper motor command rate, with an amplitude of one step size.

The oscillation of the wafer through the null position can be terminated by the addition of the electronic counter 32, switch controller 34 and normally closed switch 36 to the circuitry previously described in connection with FIG. 5. The electronic counter counts the number of sign changes that the output of the comparator 28 goes through. If a positive output from the comparator 28 is assumed to be a first signal state and the negative output from the comparator assumed to be a second signal state, then the electronic counter 32 counts the number of transitions from state 01 to state 02 of the comparator output signal. Since the positive output from the comparator represents the incremental motion of the wafer in one direction and a negative output represents incremental motion of the wafer in an opposite direction, the electronic counter 32 is in effect counting one-half the null position transits of the wafer. When the number of counts in the counter 32 exceeds a preselected number, the counter provides output to the switch controller 34 which in turn opens the normally closed switch 36, thereby stopping the step motor 30. When the motor is stopped, we are assured that the wafer is within one step of the ideal null position. Since the wafer cannot be moved in less than one-step increments due to the nature of the step motor and linkage, this is the best position that can be obtained from an incremental drive system regardless of the electronics that are used to control the drive motor.

It will be appreciated from the preceding description that the advantages of the incremental drive-null transit-counter system include the following:

1. The wafer background-to-target contrast does not affect the accuracy of the wafer positioning, therefore the system exhibits the property of automatic gain control;

2. Positioning accuracy can be made as small as desired, simply by changing the step size of the motor, or by changing the actuating linkage between the motor and the wafer support (not shown) so that the motor has a small apparent step size;

3. Electronic gain does not affect the system's stability since the comparator has an effective small signal gain about null of infinity; and, 4. An inherently unstable servo loop has been quasi-stabilized since the wafer movement stops within one step of the null position.

Figure 7:
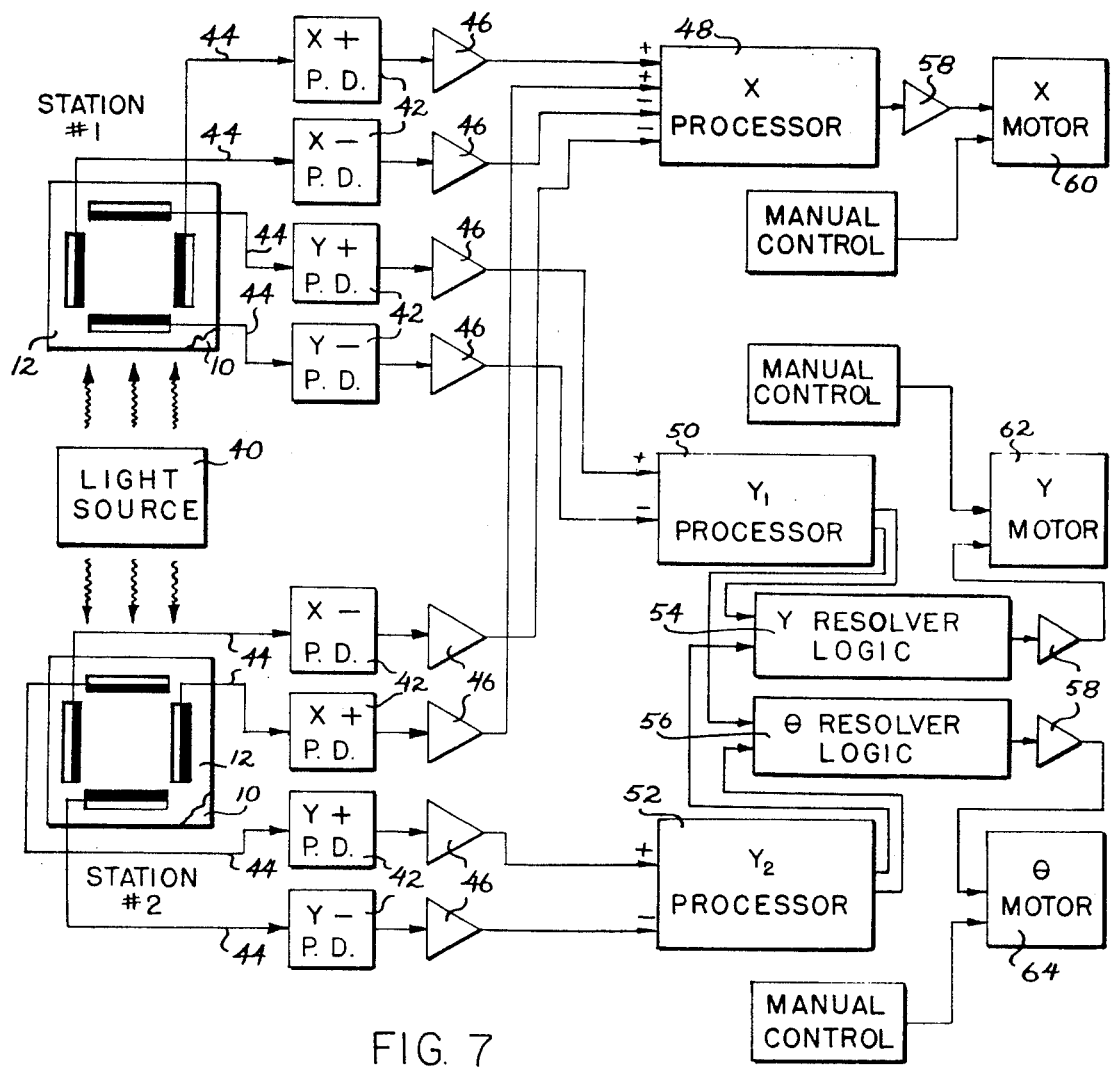
FIG. 7 is a block diagram showing the combinational photodetector signal processing used to obtain X, Y and $\theta$ wafer positioning information.

Having described the basic incremental drive-null transit-counter system of the present invention, we will now discuss in detail the application of the system to the preferred embodiment of an automatic mask-to-wafer aligner. Turning now to FIG. 7, there is shown in block diagram form a three-axis, light-balanced, null-seeking, servo-controlled, incremental drive mask-to-wafer alignment system. We have already mentioned, in connection with FIGS. 1 through 4, that two wafer alignment targets 14 are marked on the semiconductor wafer near the edges of the wafer and along one of the coordinate axes of the wafer, in this case, the X-axis. In addition, it has also been pointed out that the two wafer targets 14 are aligned with a mask 12 having two sets of mask apertures 16 which mate with two targets when the mask and wafer are correctly aligned in superposed relation. Thus, each combination of a wafer target and an apertured mask section defines an alignment station, identified in FIG. 7 as "Station #1" and "Station #2".

As shown in FIG. 7, each Station mask section 12 has four apertures or windows 16 through which light is reflected from light source 40. The reflected light is optically coupled to four corresponding photodetectors 42 at each Station, as indicated representationally in FIG. 7 by the light path lines 44. The outputs from the photodetectors 42 are amplified by amplifiers 46 and input to the appropriate X, $Y_1$ and $Y_2$ processors 48, 50 and 52, respectively. The output from the X processor 48 is an electrical signal $E_x$ having a parameter which changes between a first state and a second state depending upon the direction of the X-axis displacement of the semiconductor wafer 10 from its aligned position with respect to the mask 12.

The outputs from the $Y_1$ and $Y_2$ processors are combined in Y resolver logic 54 and $\theta$ resolver logic 56 to produce corresponding electrical error signals $E_Y$ and $E_\theta$. The $E_Y$ signal has a parameter which changes between a first state and a second state depending upon the direction of the Y-axis displacement of the wafer from the aligned position. Similarly, the $E_\theta$ signal has a parameter which changes between a first state and a second state depending upon the direction of the rotational displacement of the wafer from the aligned position.

The X, $Y_1$, $Y_2$ processors and the Y and $\theta$ resolver logic perform the following combinational signal processing:

$E_X = \text{Sgn}(X_{1+} + X_{2+} - X_{11} - X_{21})$
$E_Y = \text{Sgn}(Y_{1+} - Y_{11})$, if $\text{Sgn}(Y_{1+} - Y_{11}) \neq \text{Sgn}(Y_{2+} - Y_{21})$;
$E_Y = 0$ if $\text{Sgn}(Y_{1+} - Y_{1-}) \neq \text{Sgn}(Y_{2+} = Y_{21})$.

$E_\theta = \text{Sgn}(Y_{2+} - Y_{21})$, if $\text{Sgn}(Y_{1+} - Y_{11}) \neq \text{Sgn}(Y_{2+} - Y_{21})$;
$E_\theta = 0$ if $\text{Sgn}(Y_{1+} - Y_{11}) = \text{Sgn}(Y_{2+} - Y_{21})$.
where $\text{Sgn}(u) = +1$ if $u > 0$
$(u) = 1$ if $u < 0$
and $\text{Sgn}(0)$ is ignored, and where the first subscript represents the Station Number and the second subscript represents the sign of the photodetector.

The $E_X$, $E_Y$ and $E_\theta$ error signals are used, after suitable amplification by amplifiers 58, to drive the X, Y and $\theta$ wafer positioning motors 60, 62 and 64, respectively. From an inspection of the equations for obtaining the $E_Y$ and $E_\theta$ error signals, it can be seen that if the $Y_1$ error is equal to the $Y_2$ error in sign, then the Y-motor 62 will be driven while the $\theta$-motor 64 remains stationary. Conversely, if the $Y_1$ and $Y_2$ errors are not equal in sign, then the $\theta$-motor 64 is driven while the Y-motor 62 remains stationary. This arrangement is desirable because it overcomes the possibility of erroneous drive commands produced by the difference in saturated X-signals. If both Y-signals saturate in the same direction the derived $\theta$-signal which is the difference of the Y-signals is ambiguous and the $\theta$-motor may be driven in either direction. If both Y-signals saturate in opposite directions, the Y error signal which is the sum of the two Y-signals is ambiguous and the -Ymotor may be driven in either direction. The Y and $\theta$ resolver logic mentioned above and discussed in detail below eliminates this problem.

Figure 8:
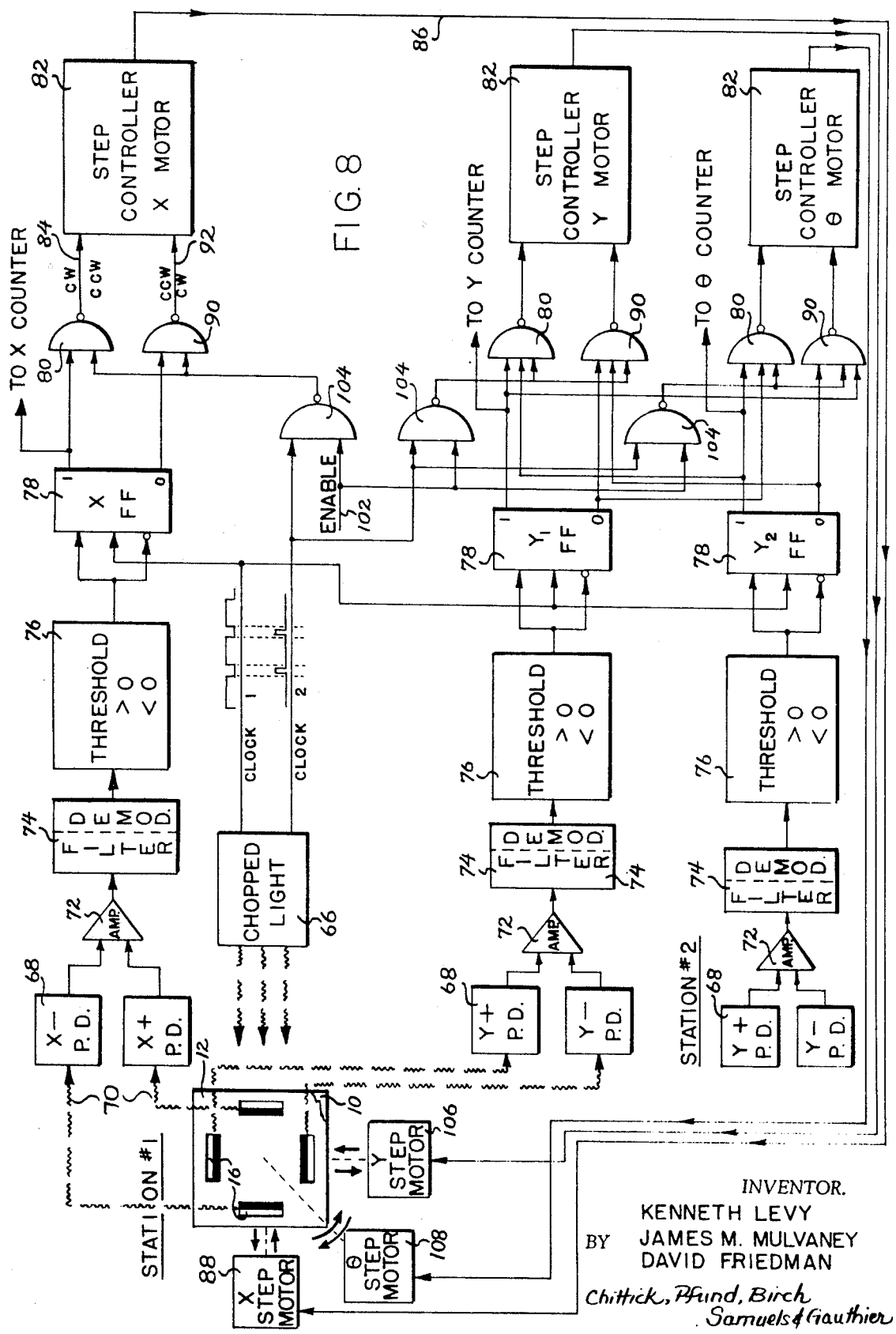
FIG. 8 is a detailed block diagram of the article-positioning system showing the X-, Y- and $\theta$-channels; and, FIG. 9 is a block diagram of the X-, Y and $\theta$ null transit counter circuits.
Figure 9:
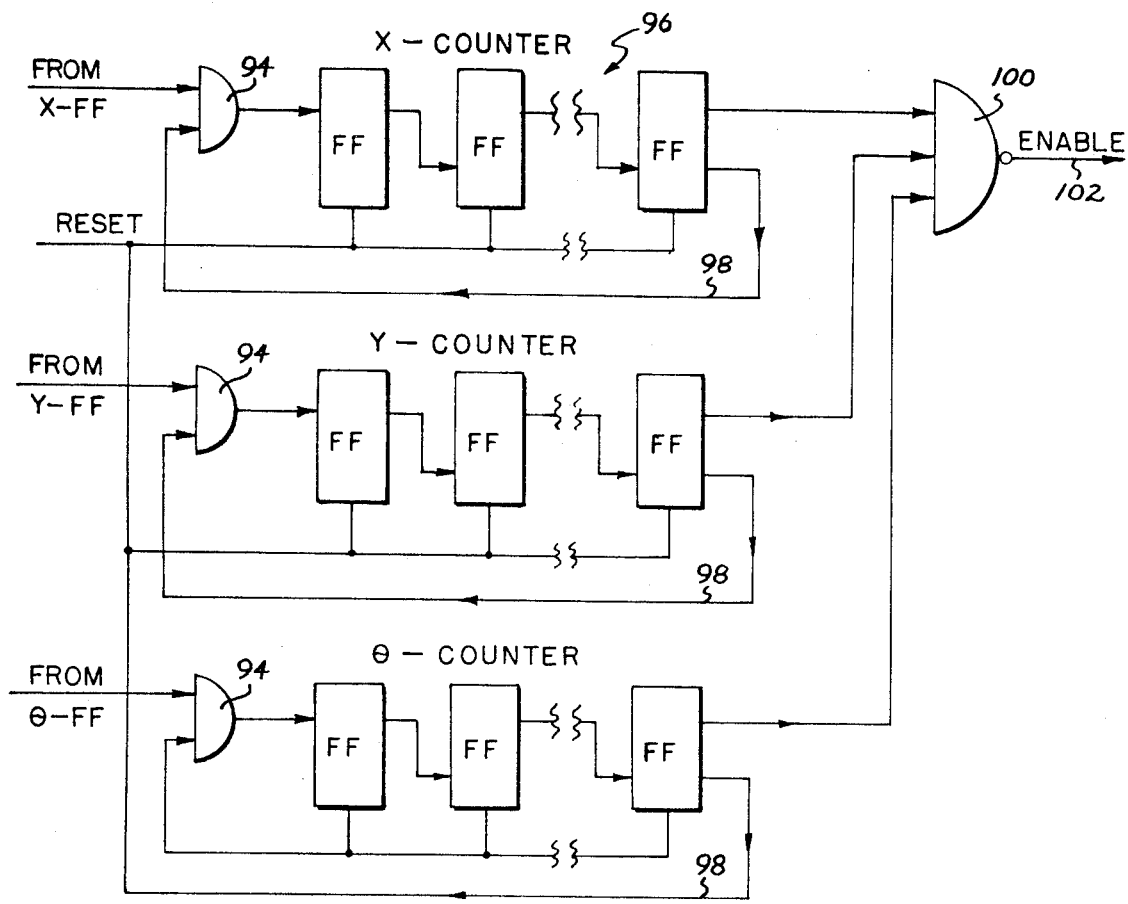

Looking now at FIGS. 8 and 9, the three-axis light-balanced, null-seeking servo-controlled incremental drive mask-to-wafer alignment system is shown in detailed block diagram form. Only the Station #1 alignment is depicted in full detail with the mask 12 illustrated in aligned and superpose position with respect to the semiconductor wafer 10. The wafer-mask combination is illuminated by 300 Hz. chopped light from a light source 66. The chopped light reflected from each of the four mask apertures 16 is optically coupled to a corresponding photodetector 68. The optical coupling of the reflected light is indicated representationally in FIG. 8 by the interrupted light paths 70 to each of the photodetectors. Such coupling can be obtained by using a microscope (not shown) that is focused upon the target pattern. If a microscope is used for the optical coupling the photodetectors 68 are positioned at the image plane of the microscope and comprises either a single, multisegment photodetector or separate photodetectors with suitable masking to control the imaging of the photodetectors.

The mask-to-wafer alignment system shown in FIGS. 8 and 9 has three separate channels to obtain the necessary X, Y and $\theta$ positioning information. The X, Y and $\theta$-channels are substantially the same with the exception of the derivation of the $\theta$ error signal and the output gating in the Y and $\theta$-channels which will be discussed subsequently. Considering now the X− channel, the electrical outputs from the X+ and X− photodetectors 68 are summed in amplifier 72 and the combined output signal is then applied as an input to a low-pass filter and demodulator 74. The output signal from filter-demodulator 74, which contains the X-axis positioning information, is applied to a threshold circuit 76. Depending upon the relative light inputs to the X+ and X− photodetectors 68, the resulting output signal from threshold circuit 76 will be either a logic 1 or 0. In view of the inherent noise in any electronic circuit, the zero case may be ignored.

The threshold output signal is used to set or reset a clocked X− channel flip-flop 78 depending upon the logic state of the signal. The threshold output signal, as either a logic 1 or 0, represents the direction in which the wafer is misaligned or displaced with respect to the X− axis. Setting or resetting of the FF is accomplished at the trailing edge of clock pulse 01 which is derived from the chopped light source 66. Assuming that the X-FF 0 output is high and that the output from threshold circuit 76 is high (logic 1), the FF will be set at the end of the next 01 clock pulse causing the 1 output of the FF to go high. Assuming, further that the second input to NAND 80 is low (and the source of this input will be explained subsequently), the step controller 82 receives a logic 1 input on lead 84. Depending upon the prewired logic of the step controller, a clockwise or counterclockwise command pulse is sent on lead 86 to X— step motor 88. The X— step motor then steps in the established direction and, through mechanical linkage, indicated by the dashed lines in FIG. 8, causes the wafer 10 to move one step along the X— axis as defined in FIG. 3. As long as the logic state of the output signal from threshold 76 remains the same, the step motor will continue to incrementally move the wafer in the same direction along the X— axis. Conversely, if the output signal from threshold circuit 76 had the opposite logic state, the 0 output of the X-FF 78 would be high thereby causing an opposite direction logic 1 signal to be sent to the step controller 82 through NAND 90 and lead 92. This in turn produces a corresponding opposite direction command pulse from the step controller to the X— step motor.

When the X— step motor incrementally moves the wafer through the null position, the logic state of the threshold circuit output signal reverse thereby causing the step motor to reverse and move the wafer back one step in the opposite direction, at which point the cycle repeats itself. Each time the X-FF 78 1 output goes high, a count pulse is fed through AND-gate 94 to the X— channel counter, indicated generally by the reference numeral 96 in FIG. 9. The counter is hardwired to provide an output signal when the counter reaches a preselected count representing the number of threshold output signal logic state reversals which, of course, correspond to the number of negative going null transitions made by the wafer. During the counting period, and AND-gate 94 is provided with a high input from the 0 output of the last stage of the counter via lock-up lead 98. When the counter 96 becomes full, the counter is locked up by the low input to AND-gate 94 from the 0 output of the last counting stage.

Identical counters are provided for the Y- and θ channels and are appropriately labeled in FIG. 9. The 1 output from the last stage of each counter is input to an "enable" NAND-gate 100. As long as any one of the counters remains unfilled, the output from NAND 100 on lead 102 will remain high. Lead 102 (FIG. 9) is connected to one input of a NAND-gate 104 (FIG. 8) whose output is the previously mentioned second input to the X— channel step controller input NAND-gates 80 and 90. NAND-gate 104 provides a low-output enable signal to the two gates 80 and 90 whenever the out-of-phase clock pulse 02 goes high.

When the count in each counter reaches the preselected count, the three inputs to the enable NAND-gate 100 (FIG. 9) go high causing the output on lead 102 to go low thereby disabling NAND-gate 104 (FIG. 8) and shutting off the X, Y and θ stepping motors 88, 106 and 108, respectively. At this point in the operational sequence, the wafer is left within one step of its desired X, Y and θ reientation.

It has already been mentioned that the X, Y and θ-channels are substantially the same with the exception of the derivation of the θ-signal and the output gating in the Y- and θ-channels. The same reference numerals have been used for the corresponding circuit components in each of the channels shown in FIG. 8 and the counters shown in FIG. 9 (excluding the individually numbered X, Y and θ step motors in FIG. 8).

The derivation of the θ-signal from the outputs of the Station #1 and Station #2 Y photodetectors 68 has already been described in connection with FIG. 7. We will now examine the output gating for the Y- and θ-channels shown in FIG. 8. Looking at FIG. 8, the outputs from the $Y_1$ flip-flop 78 are cross-coupled with the outputs from the $Y_2$ flip-flop 78, Thus the $Y_1$ FF 1 output is input to the θ-channel NAND 90 while the 0 output from the $Y_1$ FF is input to the θ-channel NAND 80. In a reverse manner, the $Y_2$ FF 1 output is connected to the Y-channel NAND 80 while the $Y_2$ FF 0 output is connected to the Y-channel NAND 90. This configuration provides the logic required to produce a $E_Y$ signal to the Y step motor 106 whenever the sign of the $Y_1$ and $Y_2$ errors is equal and at the same time prevent actuation of the θ step motor 108. Conversely, when the sign of the $Y_1$ and $Y_2$ errors is unequal, the logic circuit provides a $E_θ$ signal to the θ step motor 108 while preventing actuation of the Y step motor 106.

Figure 1A:
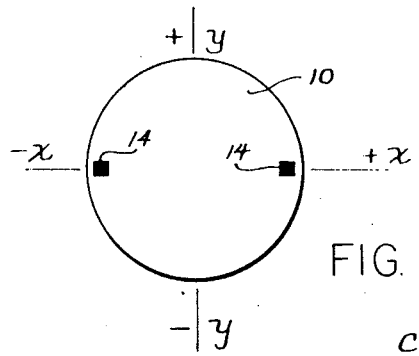
FIG. 1A is a plan view of a semiconductor wafer having two alignment targets marked thereon.

Although in the previous discussion, the θ error signal was derived from the combination of the Station #1 and Station #2 Y or second coordinate axis potodetectors, the same rotational error signal can be obtained from the first coordinate axis photodetectors if the coordinate system is rotated. It is merely necessary that a rotational displacement produce opposite signs of error in the coordinate axis detectors selected at Stations #1 and #2. For example, if the two wafer alignment targets 14 shown in FIG. 1A are positioned on the Y axis of the semiconductor wafer 10, and X and Y signal processing is interchanged and the θ signal is obtained from the outputs of the Station #1 and Station #2 X photodetectors. The logic of the output gating remains the same albeit using $X_1$ and $X_2$ signal information. It will be appreciated that this technique for eliminating the θ error signal problems produced by signal saturation can also be employed in article positioning system which do not include the previously described incremental drive-null transit counter.

Having described in detail a preferred embodiment of out invention, what we claim and desire to secure by Letters Patent of the United States is:

1. A method for positioning an article at a preselected position on an axis comprising the steps of:
    1. producing an electrical signal having a parameter which changes between a first state and a second state depending upon the position of the article with respect to the preselected position;
    2. incrementally moving said article in response to said electrical signal in a first direction parallel to said axis whenever said signal parameter is in a first state and in the opposite direction whenever the signal parameter is in the second state;
    3. counting the changes in state of said parameter; and,
    4. terminating the incremental movement of said article when the signal has made a preselected number of changes in state.

2. A method for positioning an article in a preselected translational and rotary orientation with respect to first and second coordinate axes comprising the steps of
    1. producing X, Y, and θ electrical signals having a parameter which changes between a first and a second state depending upon the direction of the respective, first coordinate axis displacement, second coordinate axis displacement and the rotational displacement of the article from the preselected orientation;
    2. incrementally moving said article in response to said X, Y, and θ electrical signals in first directions parallel to said first axis, perpendicular to said first axis and around the intersection of said axes, respectively, when the respective signals are in the first state and in the opposite directions when the respective signals are in the second state;
    3. counting the changes in state of said X, Y and θ signals; and,
    4. terminating the incremental movement of said article when each of the X, Y, and θ signals have made a preselected number of changes in state.

3. A system for positioning an article with respect to a preselected position comprising:
    means responsive to the position of an article for producing an electrical signal having a parameter which assumes either a first state or a second state depending upon the position of the article with respect to the preselected position;
    article positioning means responsive to said electrical signal for incrementally moving said article in a first direction whenever the signal parameter is in the first state and in a second direction whenever the signal parameter is in the second state;
    counting means coupled to said electrical signal producing means for counting the changes in state of said electrical signal parameter; and means responsive to a preselected count in said counting means for inhibiting said article positioning means.

4. The article positioning system of claim 3 wherein said article positioning means includes means for producing linear motion of the article in said first and second directions.

5. The article positioning system of claim 3 wherein said article positioning means includes means for producing rotary motion of the article in said first and second directions.

6. A system for positioning an article in a preselected translational and rotary orientation with respect to first and second coordinate axes comprising;

means responsive to the position of the article for producing an $X$ electrical signal having a parameter which changes between a first state and a second state depending upon the direction of the first coordinate axis displacement of the article from the preselected orientation;

an $X$ positioning means responsive to said $X$ electrical signal for incrementally translating said article parallel to the first coordinate axis in a first direction whenever the signal parameter is in the first state and in a second and opposite direction whenever the signal parameter is in the second state;

an $X$ counting means coupled to said $X$ electrical signal producing means for counting the changes in state of the $X$ signal parameter;

means responsive to the position of the article for producing a $Y$ electrical signal having a parameter which changes between a first state and a second state depending upon the direction of the second coordinate axis displacement of the article from the preselected orientation;

a $Y$ positioning means responsive to said $Y$ electrical signal for incrementally translating said article perpendicular to the first coordinate axis in a first direction whenever the signal parameter is in the first state and in an opposite direction whenever the signal parameter is in the second state;

a $Y$ counting means coupled to said $Y$ electrical signal producing means for counting the changes in state of said $Y$ parameter;

means responsive to the position of the article for producing a $\theta$ electrical signal having a parameter which changes between a first and a second state depending upon the direction of the rotational displacement of the article from the preselected orientation;

a $\theta$ positioning means responsive to said $\theta$ electrical signal for incrementally rotating said article around the intersection of the first and second coordinate axes in a first direction whenever the signal parameter is in the first state and in an opposite direction whenever the signal parameter is in the second state;

a $\theta$ counting means coupled to said $\theta$ electrical signal producing means for counting the changes in state of said $\theta$ signal parameter; and, means responsive to preselected counts in said $X$, $Y$ and $\theta$ counting means for inhibiting said $X$, $Y$ and $\theta$ article positioning means.

7. The system of claim 6 further characterized by said inhibiting means being operable only after all of said counting means have reached their respective preselected counts.

8. In an electro-optical mask-to-wafer system for aligning a wafer in a preselected translational and rotary orientation with respect to first and second mask coordinate axes, the wafer having at least two target areas which have a light reflecting characteristic contrasting with that of the wafer, the combination of:

a mask having a plurality of apertures which expose predetermined portions of said target areas when the mask is aligned in superposed relation to said wafer;

means for illuminating said target areas through said mask apertures;

means responsive to the light reflected through a first set of at least two of said mask apertures for producing an $X$ electrical signal having a parameter which changes between a first state and a second state depending upon the direction of displacement of the wafer with respect to the first coordinate axis of the mask;

means responsive to the light reflected through a second set of at least two of said mask apertures for producing a $Y$ electrical signal having a parameter which changes between a first state and a second state depending upon the direction of displacement of the wafer with respect to the second coordinate axis of the mask;

means for producing a $\theta$ electrical signal having a parameter which changes between a first state and a second state depending upon the direction of the rotational displacement of the wafer with respect to the preselected orientation;

an $X$ positioning means responsive to said $X$ electrical signal for incrementally translating said wafer parallel to the first coordinate mask axis in a first direction whenever the signal parameter is in the first state and in a second and opposite direction whenever the signal parameter is in the second state;

an $X$ counting means coupled to said $X$ electrical signal producing means for counting the changes in state of said $X$ signal parameter;

a $Y$ positioning means responsive to said $Y$ electrical signal for incrementally translating said wafer perpendicular to the first coordinate mask axis in a first direction whenever the signal parameter is in the first state and in a second and opposite direction whenever the signal parameter is in the second state:

a $Y$ counting means coupled to said $Y$ electrical signal producing means for counting the changes in state of said $Y$ signal parameter;

a $\theta$ positioning means responsive to said $\theta$ electrical signal for incrementally rotating said wafer around the intersection of the first and second coordinate mask axes in a first direction whenever the signal parameter is in the first state and in a second and opposite direction whenever the signal parameter is in the second state;

a $\theta$ counting means coupled to said $\theta$ electrical signal producing means for counting the changes in state of said $\theta$ signal parameters; and, means responsive to preselected counts in said $X$, $Y$ and $\theta$ counting means for inhibiting said $X$, $Y$ and $\theta$ article positioning means.

9. The system of claim 8 further characterized by said inhibiting means being operable only after all of said counting means have reached their respective preselected counts.

10. In an electro-optical mask-to-wafer system for aligning a wafer in a preselected translational and rotary orientation with respect to first and second mask coordinate axes, the wafer having at least two target areas which have a light reflecting characteristic contrasting with that of the wafer, the combination of:

a mask having a plurality of apertures which expose predetermined portions of said target areas when the mask is aligned in superposed relation to said wafer, said target area portions and superposed mask apertures defining first and second target alignment stations;

means for illuminating said target area portions through said mask apertures;

means responsive to the light reflected through a first set of at least two of said mask apertures at said first alignment station for producing an $X$ error electrical signal having a parameter which changes between a first state and second state depending on the direction of displacement of the wafer with respect to the first coordinate axis of the mask;

means responsive to the light reflected through a second set of at least two of said mask apertures at said first alignment station for producing a $Y_1$ electrical signal having a parameter which changes between a first state and a second state depending on the direction of displacement of the wafer with respect to the second coordinate axis of the mask;

means responsive to the light reflected through a first set of at least two of said mask apertures at said second alignment station for producing a $Y_2$ electrical signal having a parameter which changes between a first state and a second state depending upon the direction of displacement of the wafer with respect to the second coordinate axis of the mask;

means for producing a $\theta$ error electrical signal having a parameter which changes between a first state and a second state depending upon the direction of the rotational displacement of the wafer with respect to the preselected orientation, said $\theta$ error signal being produced only when the $Y_1$ and $Y_2$ signal parameter states are not the same;

means for producing a $Y$ error electrical signal having a parameter which changes between a first state and a second state depending upon the direction of displacement of the wafer with respect to the second coordinate axis of the mask, said $Y$ error signal being produced only when the $Y_1$ and $Y_2$ signals are in the same state:

an $X$ positioning means responsive to said $X$ error electrical signal for translating said wafer parallel to the first coordinate mask axis in a first direction whenever the signal parameter is in the first state and a second and opposite direction whenever the signal parameter is in the second state;

a $Y$ position means responsive to said $Y$ error electrical signal for translating said wafer perpendicular to the first coordinate mask axis in a first direction whenever the signal parameter is in the first state and in a second and opposite direction whenever the signal parameter is in the second state;

and, a $\theta$ positioning means responsive to said $\theta$ error electrical signal for rotating said wafer around the intersection of the first and second coordinate mask axis in a first direction whenever the signal parameter is in the first state and in a second and opposite direction whenever the signal parameter is in the second state.

* * * * *

UNITED STATES PATENT OFFICE
CERTIFICATE OF CORRECTION

Patent No. 3,617,751    Dated November 2, 1971

Inventor(s) Kenneth Levy, James M. Mulvaney, David Friedman

It is certified that error appears in the above-identified patent and that said Letters Patent are hereby corrected as shown below:

Abstract, line 10 change "x,y " to -- X,Y --;

Col. 1, lines 49,57,59, change "X-, Y-" to -- X, Y--;

line 74, change "$\theta_0$" to -- $\theta$ --;

Col. 2, lines 34,43,74, change "X-,Y- and $\theta$-" to -- X,Y and $\theta$ --;

Col. 4, line 12, change "Eq.01" to -- Eq. #1--;

line 19, change "Eq.01" to -- Eq. #1--;

line 20, change "Eq. 02" to -- Eq. #2--;

line 30, change "Eq. 03" to -- Eq. #3--;

line 32, change "Eq. 04" to -- Eq. #4--;

line 33, change "Eq.0-b4 by Eq. 03" to -- Eq. #4 by Eq. #3--;

line 38, insert "(Eq.#5)" ;

UNITED STATES PATENT OFFICE
CERTIFICATE OF CORRECTION

Patent No. 3,617,751　　　　　　　Dated November 2, 1971

Inventor(s) Kenneth Levy, James M. Mulvaney, David Friedman

It is certified that error appears in the above-identified patent and that said Letters Patent are hereby corrected as shown below:

- 2 -

Col. 4, line 47, change "$e_3$" to -- $e_d$ --;

line 58, change "output" to -- outputted --;

line 74, change "01 and 02" to -- #1 and #2 --;

Col. 5, lines 74-76, the equations should read as follows:

$$E_X = \text{Sgn}(X_{1+} + X_{2+} - X_{1-} - X_{2-})$$

$$E_Y = \text{Sgn}(Y_{1+} - Y_{1-}) \text{ if Sgn}(Y_{1+} - Y_{1-}) = \text{Sgn}(Y_{2+} - Y_{2-})$$

$$E_Y = 0 \text{ if Sgn}(Y_{1+} - Y_{1-}) \neq \text{Sgn}(Y_{2+} - Y_{2-}).$$

Col. 6, lines 1 and 2, the equations should read as follows:

$$E_\theta = \text{Sgn}(Y_{2+} - Y_{2-}) \text{ if Sgn}(Y_{1+} - Y_{1-}) \neq \text{Sgn}(Y_{2+} - Y_{2-});$$

$$E_\theta = 0 \text{ if Sgn}(Y_{1+} - Y_{1-}) = \text{Sgn}(Y_{2+} - Y_{2-}).$$

line 4, change "(u)=1" to -- (u)= -1 --;

lines 69 and 73, change "01" to -- #1 --;

Col. 7, line 11, change "0 output" to -- ZERO output --;

line 23, change "1 output" to -- ONE output --;

UNITED STATES PATENT OFFICE
CERTIFICATE OF CORRECTION

Patent No. 3,617,751     Dated November 2, 1971

Inventor(s) Kenneth Levy, James M. Mulvaney, David Friedman

It is certified that error appears in the above-identified patent and that said Letters Patent are hereby corrected as shown below:

- 3 -

Col. 7, line 31, change "0 output" to -- ZERO output--;

line 34, change "0 output" to -- ZERO output--;

line 35, change "θhannels" to -- θ channels--;

line 36, change " 1 output" to ONE output--;

line 45, change "o2" to -- #2--;

line 53, change "θ- channels" to -- θ channels--;

line 56, change "Y- and θ-channels" to -- Y and θ channels;

line 61, change "θ-signal" to -- θ signal--;

line 64, change "Y-and θ- channels" to -- Y and θ channels--;

line 68, change "0 input" to -- ZERO input--;

line 69, change "1 output" to -- ONE output--;
line 70, change "0 output" to -- ZERO output;

Col. 8, line 21, change "out" to -- our--.

Signed and sealed this 6th day of June 1972.

(SEAL)
Attest:

EDWARD M. FLETCHER, JR.                ROBERT GOTTSCHALK
Attesting Officer                       Commissioner of Patents